UNITED STATES PATENT OFFICE.

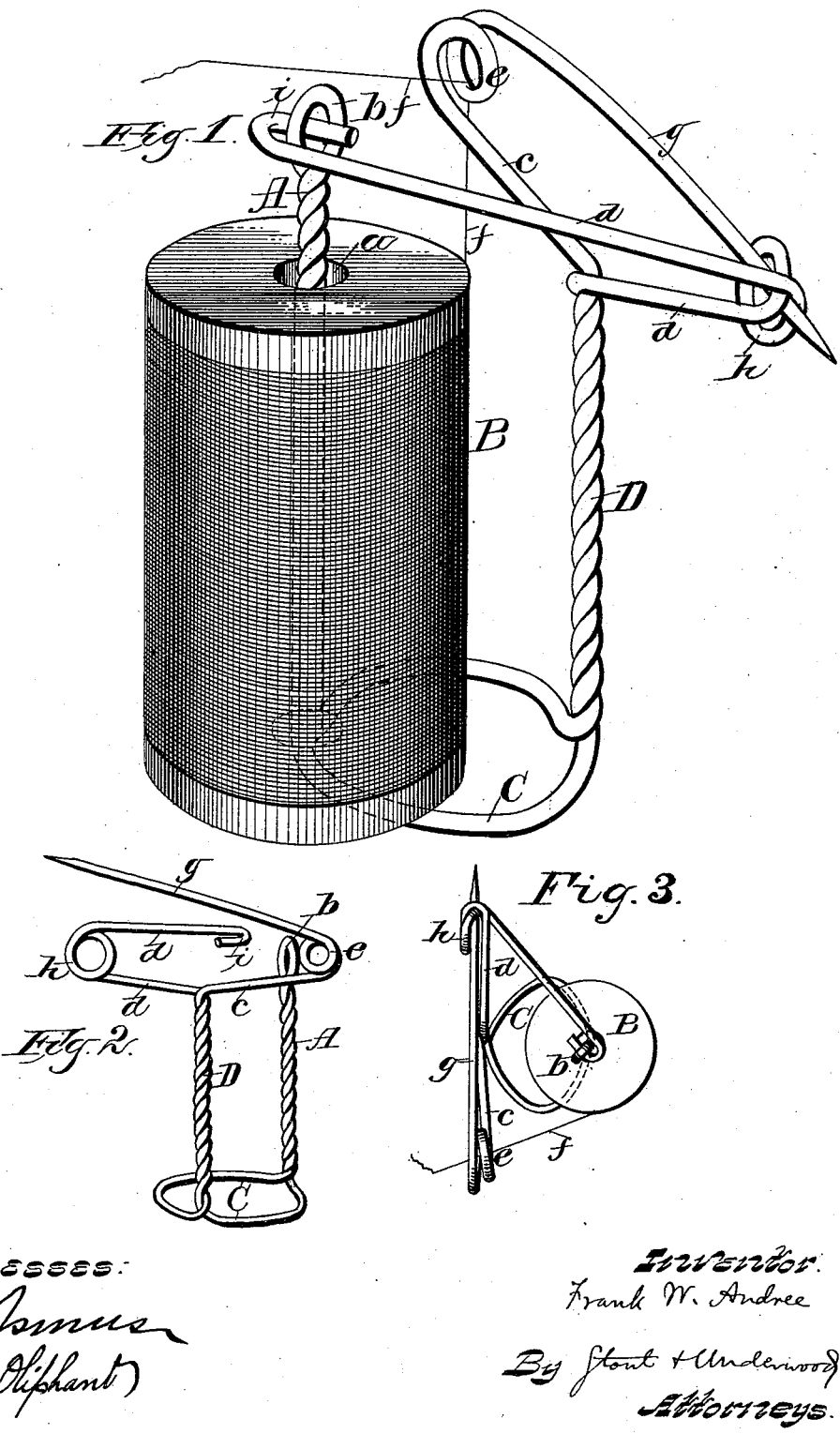

FRANK W. ANDREE, OF MILWAUKEE, WISCONSIN.

SPOOL-HOLDER.

SPECIFICATION forming part of Letters Patent No. 352,728, dated November 16, 1886.

Application filed June 26, 1886. Serial No. 206,317. (No model.)

*To all whom it may concern:*

Be it known that I, FRANK W. ANDREE, of Milwaukee, in the county of Milwaukee, and in the State of Wisconsin, have invented certain new and useful Improvements in Spool-Holders; and I do hereby declare that the following is a full, clear, and exact description thereof.

My invention relates to spool-holders and thread-guides, and has for its object to provide a simple, durable, and inexpensive article of personal wear for the use of tailors and others, whereby the thread may be kept within convenient reach and the spool prevented from becoming mislaid or lost during the operation of sewing.

My invention therefore consists in certain peculiarities of construction, whereby a stem and seat for the spool and a guide for the thread are formed integral with means for retaining said spool in operative position and for attaching the device to the person, as will be hereinafter described, with reference to the accompanying drawings, in which—

Figure 1 represents an enlarged perspective view of my device, showing its application; Fig. 2, a similar view, (actual size,) showing the spool removed and the pin uncaught; and Fig. 3, a top plan view with the spool in place and pin secured.

Referring by letter to the drawings, A represents a vertical stem, designed to pass through the bore $a$ of an ordinary thread-spool, B, said stem having its upper end provided with an eye, $b$, and its lower end joined to a horizontal seat, C, that forms a support for the spool. Joined to the seat C, opposite to the stem A, is another vertical stem, D, bifurcated at its top to form arms $c\ d$. The arm $c$ is provided with an eye, $e$, that acts as a guide for the thread $f$ as the latter is unwound from the spool B, and said arm is carried back to form a spring-pin, $g$. The arm $d$ is provided with a loop, $h$, and between this loop and arm is caught the pointed end of the pin $g$ when the device is attached to the person. From the loop $h$ the arm $d$ is carried in toward the spool-stem A, and has its end terminated in a hook, $i$, that engages the eye $b$ of said stem, to thereby retain the spool in operative position, this entire construction and application of the device being thoroughly illustrated in Fig. 1.

When the hook $i$ is disengaged from the eye $b$, as shown by Fig. 2, the spool can be readily placed upon or withdrawn from the stem A, the latter being sprung out sufficiently to allow said spool to clear the arm $d$. After a spool has been placed in the position described the free end of the thread is passed through the guide $e$, and the whole is ready to be pinned to the person within convenient reach, thus forming a neat useful device that will prevent the mislaying or loss of the spool, and also limit the unwinding of the material thereon to just such quantity as may be needed from time to time by the operator, thus keeping said material from becoming tangled.

The device being secured upon the person, spools may be readily placed in position for use, or removed when the thread is exhausted without unpinning.

The device above described is preferably constructed from a single wire bent and twisted to form the several parts referred to by letter, said device being easily and cheaply manufactured without the aid of special tools and appliances.

Having thus fully described my invention, what I claim as new, and desire to secure by Letters Patent, is—

1. A spool-holder consisting of a stem and seat for the spool, said stem having an eye in its upper end, another stem joined to the spool-seat parallel to the former stem and bifurcated at its upper end to form arms, one of said arms bent to form a thread-guide and attaching-pin, and the other arm bent to form a loop that secures the free end of the pin, and a hook that engages the eye in said spool-stem, substantially as and for the purpose set forth.

2. A spool-holder consisting of a single continuous wire comprising a vertical stem having an eye in its upper end, a horizontal seat, another stem parallel to the former one and bifurcated at its upper end to form arms, one of these arms being the pin for securing said holder to the person, and provided with an eye that acts as a thread-guide, and the other arm bent to form a loop to secure the free end of the pin, and a hook that engages the eye in said spool-stem, substantially as and for the purpose set forth.

In testimony that I claim the foregoing I have hereunto set my hand, at Milwaukee, in the county of Milwaukee and State of Wisconsin, in the presence of two witnesses.

FRANK W. ANDREE.

Witnesses:
H. G. UNDERWOOD,
N. E. OLIPHANT.